Patented Oct. 3, 1933

1,928,719

UNITED STATES PATENT OFFICE 1,928,719

VAT DYESTUFFS OF THE 1.4.5.8-NAPHTHOY-LENE-DIARYL-IMIDAZOL SERIES AND A PROCESS OF PREPARING THEM

Wilhelm Eckert, Frankfort - on - Main - Hochst, Germany, assignor to General Aniline Works, Inc., New York, N. Y., a corporation of Delaware No Drawing. Application October 14, 1929, Serial No. 399,696, and in Germany October 29, 1928

19 Claims. (Cl. 260—44)

The present invention relates to vat dyestuffs of the 1.4.5.8-naphthoylene-diaryl-imidazol series and to a process of preparing them.

I have found that new vat dyestuffs of the naphthoylene diaryl-imidazol series are obtained by causing a naphthoylene-diaryl-imidazol containing halogen in the aryl groups to react with nitrogen containing compounds of the following general formula: $R.NH_2$ wherein R stands for a substituted or unsubstituted aromatic group in a high-boiling solvent such as nitrobenzene, naphthalene or the like in the presence of an acid-binding agents such, for instance, as sodium acetate, potassium acetate, sodium carbonate, potassium carbonate or the like. The reaction mixture preferably is heated to the boiling point of the solvent and a catalyst such, for instance, as metallic copper powder or a copper salt such as cuprous chloride, copper chloride, copper acetate or the like may be added.

The new vat dyestuffs thus obtained have the following probable formula:

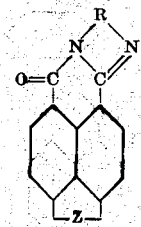

wherein Z stands for the bivalent radical:

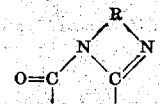

R representing a bivalent aromatic radical, bound in o-positions to the nitrogen atoms and containing at least one substituent of the group: —$NHR_1$.

$R_1$ being a substituted or unsubstituted aromatic group. They have very good fastness properties.

The naphthoylene - halogen - diaryl - imidazols used as starting materials can, for instance, be prepared according to the process of U. S. patent specification No. 1,588,451, dated June 15, 1926, granted to Wilhelm Eckert and Heinrich Greune by condensing 1.4.5.8-naphthalene-tetra-carboxylic acid or the anhydride thereof with halogen-ortho-diamines, such for instance, as chloro- or bromo-ortho-phenylene-diamine, or by directly halogenating the naphthoylene-diaryl-imidazols.

Hereby, dyestuffs are obtained, for instance, of the following type:

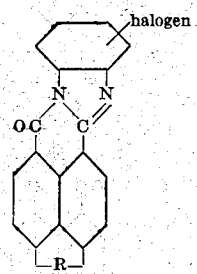

wherein R represents the bivalent radical

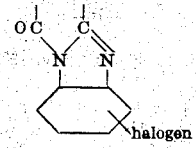

The starting materials can furthermore be prepared by diazotizing the naphthoylene-aminodiaryl-imidazols and replacing the diazo group by halogen according to Sandmeyer's reaction.

The same dyestuffs as those prepared according to the process above described can be obtained by causing naphthoylene-diaryl-imidazols which contain in the aryl groups one or several amino groups to react with organic halogen compounds.

The following examples serve to illustrate my invention but they are not intended to limit it thereto; the parts being by weight:

(1) 48 parts of 1.4.5.8-naphthoylene-4'.4''-dichloro-dibenz-imidazol of the following probable constitution:

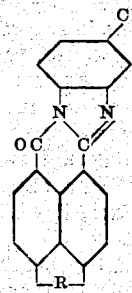

wherein R represents the bivalent radical

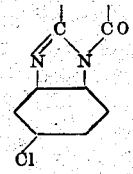

(obtainable for intance by condensing 1.4.5.8-naphthalene-tetra-carboxylic acid with 4-chloro-phenylene-diamine according to the process of the above mentioned U. S. patent specification) are heated to boiling for about 15 hours together with 45 parts of alpha-amino-anthraquinone in 1200 parts of nitrobenzene while adding 20 parts of potassium carbonate and 10 parts of cuprous chloride. After cooling the reaction product is filtered by suction, washed with alcohol, boiled out with water and dried. It represents a nearly black powder dyeing cotton from a greenish vat a very fast corinth, whereas the starting material dyes a reddish brown shade. The product thus obtained has the following probable formula:

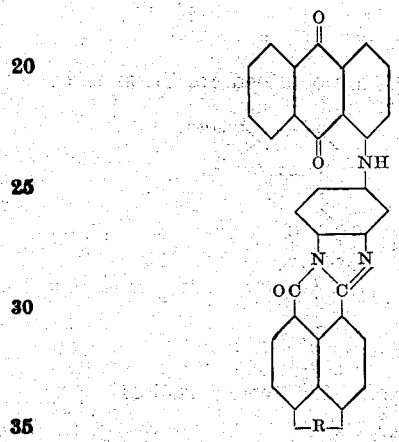

wherein R represents the bivalent radical

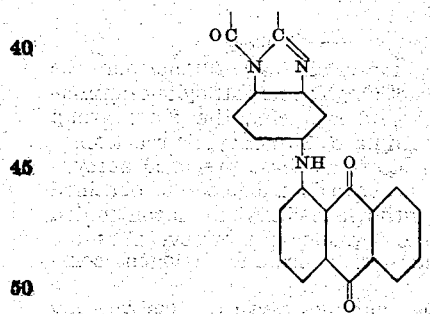

The same dyestuff is obtained by causing 1.4.5.8-naphthoylene-4'.4''-diamino-dibenzimidazol to react in the same way with an alpha-chloroanthraquinone. The 1.4.5.8-naphthoylene-4'.4''-diamino-dibenzimidazol used as starting material may be obtained, for instance, by condensing. 1.4.5.8-naphthalene-tetra-carboxylic acid with 4-nitro-ortho-phenylene-diamine according to the process of the above mentioned U. S. patent specification and subsequently reducing the product thus obtained or by directly nitrating and reducing the 1.4.5.8-naphthoylene-dibenzimidazol.

A dyestuff of equal or similar properties is obtained by condensing as above described with an alpha-aminoanthraquinone the dyestuff which can be prepared by brominating the 1.4.5.8-naphthoylene-dibenzimidazol in chlorosulfonic acid while adding a catalyst.

(2) 57 parts of 1.4.5.8-naphthoylene-4'.4''-dibromo-dibenzimidazol of the following probable formula:

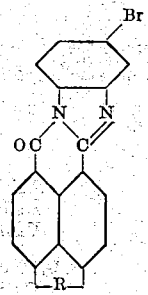

wherein R represents the bivalent radical

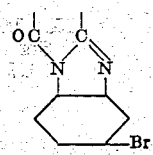

and 52 parts of 1-amino-5-benzoyl-amino-anthraquinone are suspended in 1700 parts of dry nitrobenzene. 20 parts of cuprous chloride and 20 parts of potassium carbonate are added and the mixture is boiled for about 24 hours. The dyestuff thus obtained is boiled out with chlorobenzene and washed with alcohol and water. It represents a dark powder which dissolves in concentrated sulfuric acid to a brown solution. It dyes cotton a dull brown shade. Its fastness properties are excellent. It probably has the following constitution:

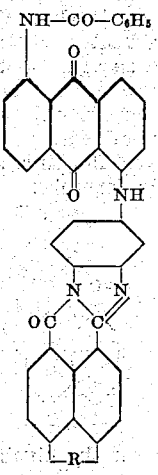

wherein R represents the bivalent radical

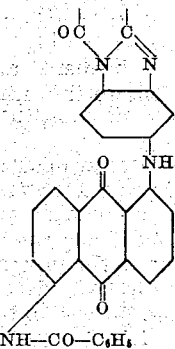

(3) By using instead of the 1-amino-5-benzoylamino-anthraquinone of Example 2 equal parts of 1-amino-4-benzoylamino-anthraquinone and proceeding in the same manner as indicated in this example a dyestuff is obtained dyeing greenish-grey tints. It is difficultly soluble in all, even in hot, organic solvents and melts at above 300° C. It probably has the following probable constitution:

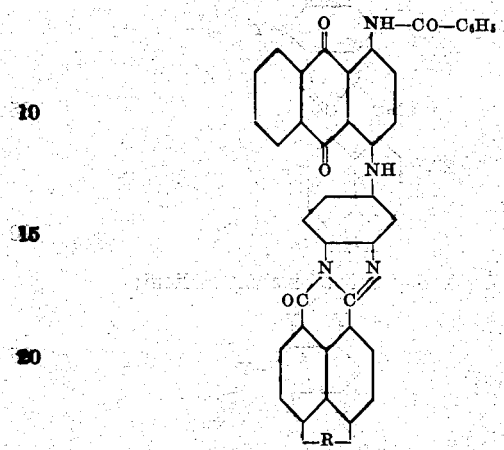

wherein R represents the bivalent radical

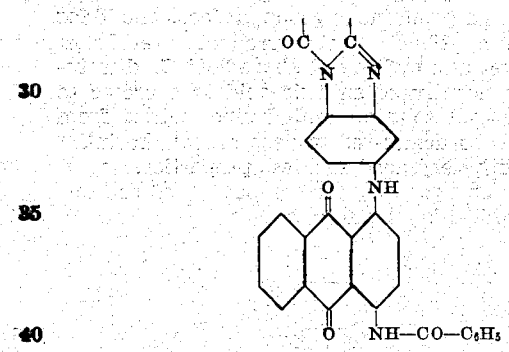

(4) A suspension of 57 parts of 1.4.5.8-naphthoylene-4'.-4''-dibromo-dibenzimidazol, 20 parts of potassium acetate, 20 parts of cuprous chloride and 60 parts of 1-amino-2-methylanthraquinone in 1700 parts of nitrobenzene is heated to boiling temperature. After about 24 hours the reaction is finished. The hot condensation product is filtered by suction, washed with alcohol and boiled with water. The dyestuff dissolves in concentrated sulfuric acid and in concentrated hydrochloric acid to a brown solution. In organic solvents it is insoluble. It dyes cotton an intensive dull brown shade and probably has the following probable constitution:

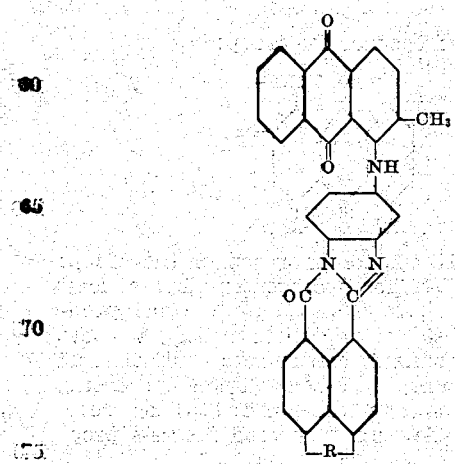

wherein R represents the bivalent radical

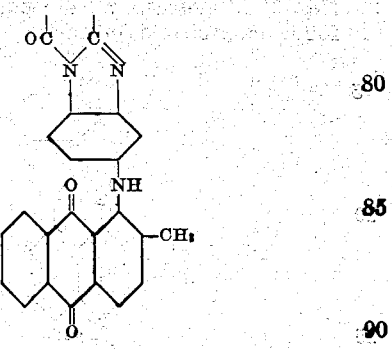

(5) 30 parts of 1.4.5.8-naphthoylene-4'.4''-diamino-dibenzimidazol of the following probable formula:

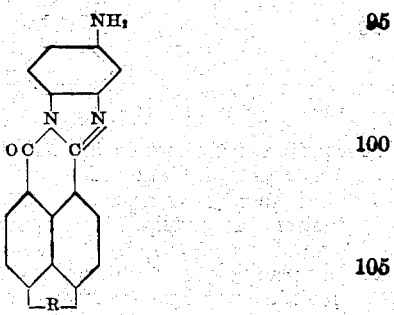

wherein R represents the bivalent radical

(prepared by condensation of 1.4.5.8-naphthalene-tetracarboxylic acid with 4-nitro-1.2-phenylene-diamine according to the process of the above mentioned U. S. patent specification and subsequent reduction) are heated to boiling for 8 hours in 840 parts of benzoyl-chloride. After cooling the product thus formed is filtered by suction and washed with alcohol. It represents a dark-brown powder which dissolves in concentrated sulfuric acid to a brownish-red solution. It dyes cotton fast bordeaux-red tints. It probably has the following constitution:

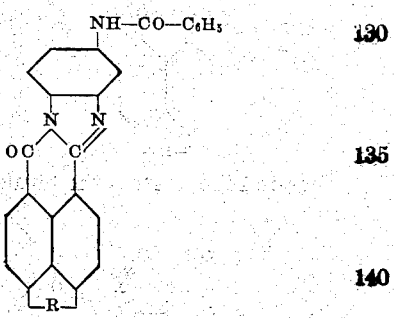

wherein R represents the bivalent radical

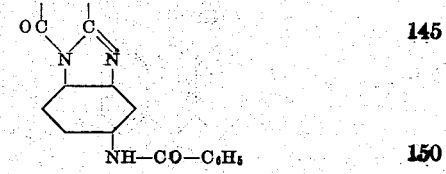

(6) A suspension of 1.4.5.8-naphthoylene-3'.5'-3".5"-tetra-brom-dibenzimidazol of the following probable formula:

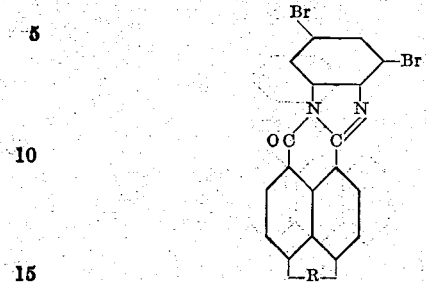

wherein R represents the bivalent radical

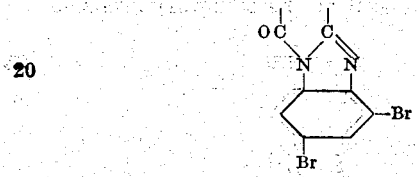

(prepared by condensing the dianhydride of the 1.4.5.8-naphthalene-tetra-carboxylic acid or the said acid itself with 3.5-dibromo-1.2-diaminobenzene according to the above mentioned U. S. patent specification), 25 parts of alpha-amino-anthraquinone, 20 parts of anhydrous sodium acetate and 5 parts of copper acetate in 1200 parts of nitrobenzene is heated to boiling for 16–20 hours. After cooling the new dyestuff thus obtained is filtered by suction, washed with alcohol and boiled with water. It represents a nearly black powder which dissolves in high-boiling hot organic solvents to a deep brown solution; at a temperature of 300° C. the dyestuff is not yet molten. It dyes cotton from a clear brown vat greyish-brown tints and probably has the following constitution:

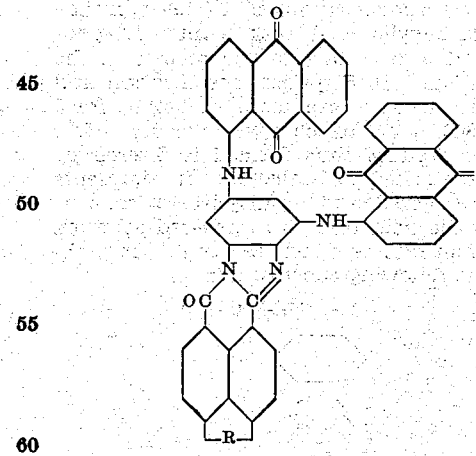

wherein R represents the bivalent radical

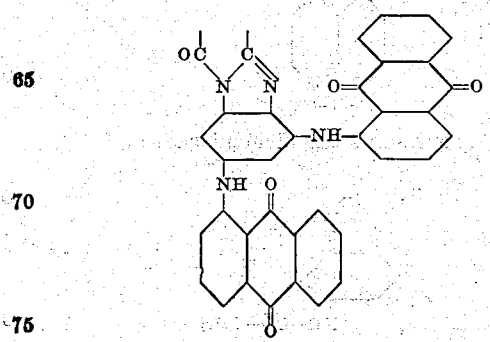

I claim:
1. As new products, the compounds of the following probable formula:

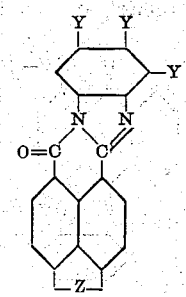

wherein Z stands for the bivalent radical:

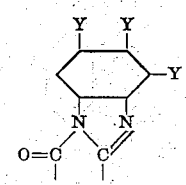

and Y for hydrogen or the group: $-NH-R_1$, $R_1$ being an anthraquinone group, at least one Y for the group: $-NH-R_1$, which products are almost black dyestuffs melting at above 300° C., dissolving in concentrated sulfuric acid to a brown to brownish-red solution and dyeing cotton from the vat a bordeaux-red to deep brown (korinth) shade with very good fastness properties.

2. As new products, the compounds of the following probable formula:

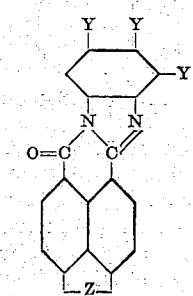

wherein Z stands for the bivalent radical:

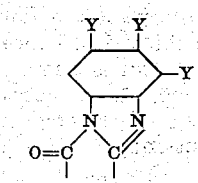

and Y for hydrogen or the group:

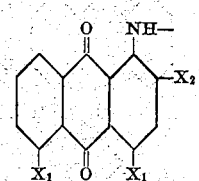

wherein $X_1$ stands for hydrogen or the group: -NH-acyl and $X_2$ for hydrogen or alkyl, at least one Y being the above stated group, which products are almost black dyestuffs melting at above 300° C., dissolving in concentrated sulfuric acid to a brown to brownish-red solution and dyeing cotton from the vat a bordeaux-red to deep brown (korinth) shade with very good fastness properties.

3. As new products, the compounds of the following probable formula:

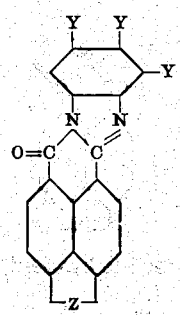

wherein Z stands for the bivalent radical:

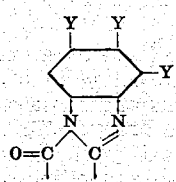

and Y for hydrogen or the group:

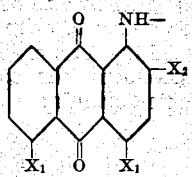

wherein $X_1$ stands for hydrogen or the group: $-NH-CO.C_6H_5$ and $X_2$ for hydrogen or methyl, at least one Y being the above stated group, which products are almost black dyestuffs melting at above 300° C., dissolving in concentrated sulfuric acid to a brown to brownish-red solution and dyeing cotton from the vat a bordeaux-red to deep brown (korinth) shade with very good fastness properties.

4. As new products, the compounds of the following probable formula:

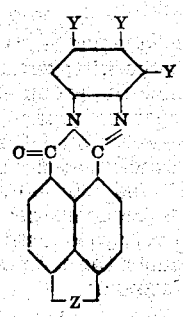

wherein Z stands for the bivalent radical:

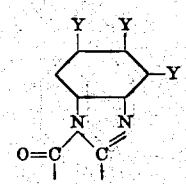

and Y for hydrogen or the group:

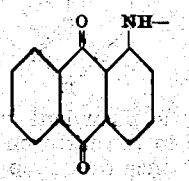

at least one Y being the above stated group, which products are almost black dyestuffs melting at above 300° C., dissolving in concentrated sulfuric acid to a brown to brownish-red solution and dyeing cotton from the vat a bordeaux-red to deep brown (korinth) shade with very good fastness properties.

5. The process of preparing vat dyestuffs which comprises heating in a high-boiling solvent a 1.4.5.8-naphthoylene-diaryl-imidazol the aryl of which belongs to the benzene series and contains halogen with a compound of the general formula: $R.NH_2$ wherein R stands for an aromatic carbocyclic group in the presence of an acid-binding agent.

6. The process of preparing vat dyestuffs which comprises heating to boiling temperature in a high-boiling solvent a 1.4.5.8-naphthoylene-diaryl-imidazol the aryl of which belongs to the benzene series and contains halogen with a compound of the general formula: $R.NH_2$ wherein R stands for an aromatic carbocyclic group in the presence of an acid-binding agent and a catalyst.

7. The process of preparing vat dyestuffs which comprises heating in a high-boiling solvent a 1.4.5.8-naphthoylene-dibenzimidazol containing halogen in the benzo-groups with a compound of the general formula: $R.NH_2$ wherein R stands for an aromatic carbocyclic group in the presence of an acid-binding agent.

8. The process of preparing vat dyestuffs which comprises heating to boiling temperature in a high-boiling solvent a 1.4.5.8-naphthoylene-dibenzimidazol containing halogen in the benzo-groups with a compound of the general formula: $R.NH_2$ wherein R stands for an aromatic carbocyclic group in the presence of an acid-binding agent and a catalyst.

9. The process of preparing vat dyestuffs which comprises heating in a high-boiling solvent a 1.4.5.8-naphthoylene-dibenzimidazol containing halogen in the benzo-groups with a compound of the general formula: $R.NH_2$ wherein R stands for an anthraquinonyl group in the presence of an acid-binding agent.

10. The process of preparing vat dyestuffs which comprises heating to boiling temperature in a high-boiling solvent a 1.4.5.8-naphthoylene-dibenzimidazol containing halogen in the benzo-groups with a compound of the general formula: $R.NH_2$ wherein R stands for an anthroquinonyl group in the presence of an acid-binding agent and a catalyst.

11. The process of preparing a vat dyestuff which comprises heating to boiling temperature for several hours in nitrobenzene a 1.4.5.8-naphthoylene-dibenzimidazol of the following probable formula:

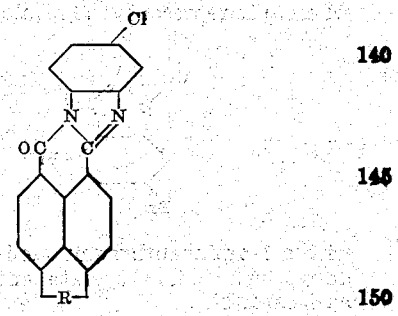

wherein R represents the bivalent radical

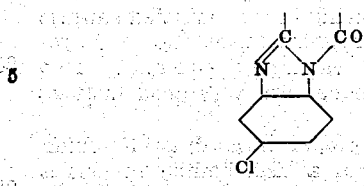

with 1-aminoanthraquinone in the presence of potassium carbonate and cuprous chloride as a catalyst.

12. The process of preparing a vat dyestuff which comprises heating to boiling temperature for several hours in nitrobenzene a 1.4.5.8-naphthoylene-dibenzimidazol of the following probable formula:—

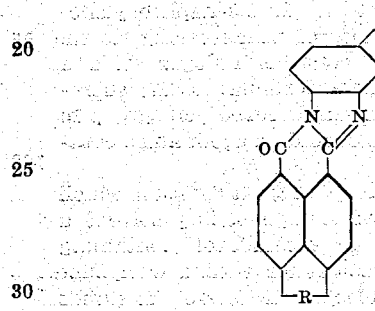

wherein R represents the bivalent radical

with 1-amino-5-benzoylaminoanthraquinone in the presence of potassium carbonate and cuprous chloride as a catalyst.

13. The process of preparing a vat dyestuff which comprises heating to boiling temperature for several hours in nitrobenzene a 1.4.5.8-naphthoylene-dibenzimidazol of the following probable formula:

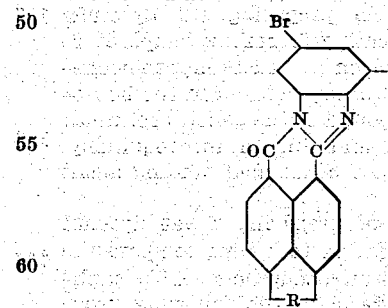

wherein R represents the bivalent radical

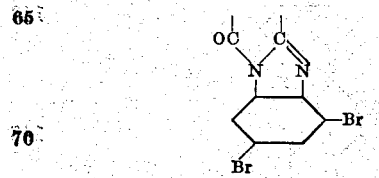

with a 1-aminoanthraquinone in the presence of anhydrous sodium acetate and copper acetate as a catalyst.

14. As new products, the compounds of the following probable formula:

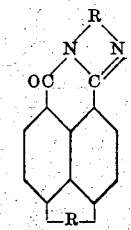

wherein Z stands for the bivalent radical

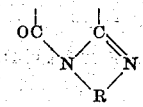

R representing a bivalent aromatic radical of the benzene series bound in ortho-positions to the nitrogen atoms and containing at least one substituent of the group: -NH.$R_1$, $R_1$ being an aromatic carbocyclic group which products are almost black dyestuffs melting at above 300° C., dissolving in concentrated sulfuric acid to a brown to brownish-red solution and dyeing cotton from the vat a bordeaux-red to deep-brown (korinth) shade of very good fastness properties.

15. As new products, the compounds of the following probable formula:

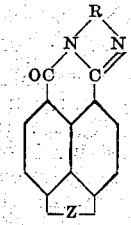

wherein Z stands for the bivalent radical

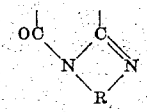

R representing a phenylene radical bound in ortho-positions to the nitrogen atoms and containing at least once the group -NH$R_1$, $R_1$ being an aromatic carbocyclic group which products are almost black dyestuffs melting at above 300° C., dissolving in concentrated sulfuric acid to a brown to brownish-red solution and dyeing cotton from the vat a bordeaux-red to deep brown (korinth) shade of very good fastness properties.

16. As new products, the compounds of the following probable formula:

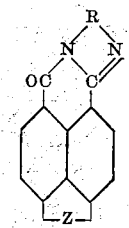

wherein Z stands for the bivalent radical

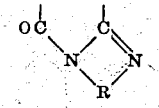

R representing a phenylene radical bound in ortho-positions to the nitrogen atoms and containing at least once the group -NH$R_1$, $R_1$ being an anthraquinone compound which products are almost black dyestuffs melting at above 300 C., dissolving in concentrated sulfuric acid to a brown to brownish-red solution and dyeing cotton from the vat a bordeaux-red to deep brown (korinth) shade of very good fastness properties.

17. As a new product, the compound of the following probable formula:

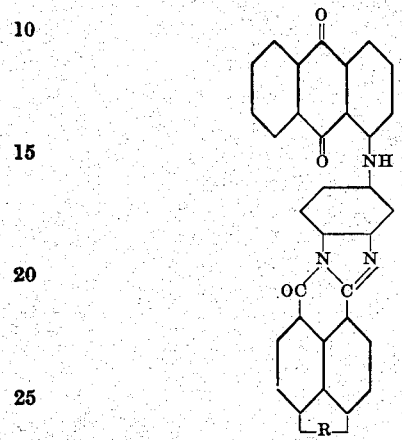

wherein R represents the bivalent radical

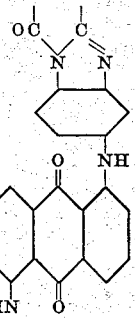

said product being a nearly black powder which dyes cotton from a greenish vat very fast korinth tints.

18. As a new product, the compound of the following probable formula:

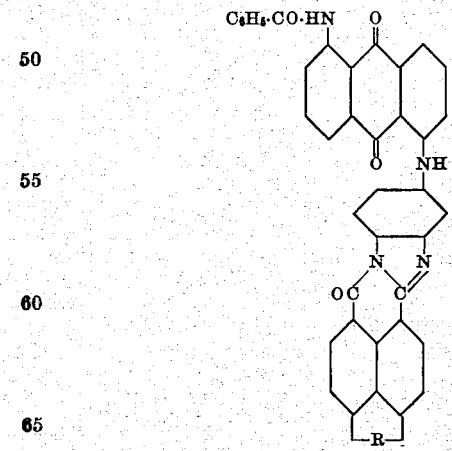

wherein R represents the bivalent radical

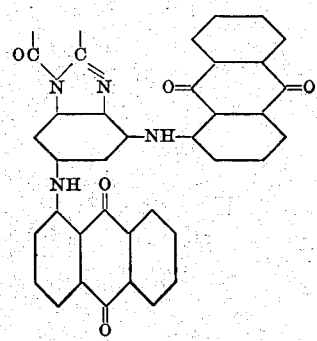

said product being a dark powder which dissolves in concentrated sulfuric acid to a brown solution and dyes cotton a dull brown shade of very good fastness properties.

19. As a new product, the compound of the following probable formula:

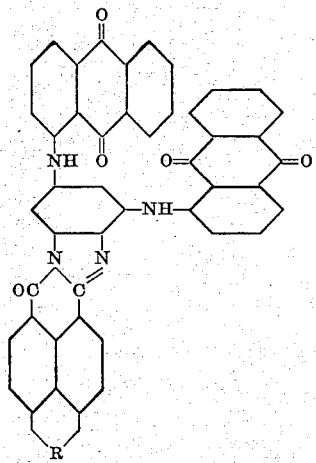

wherein R represents the bivalent radical:

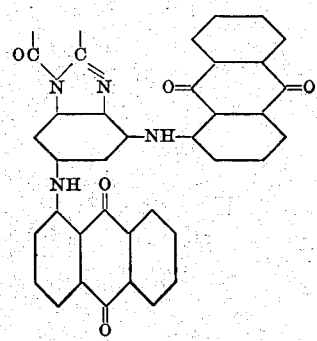

said product being a nearly black powder which dissolves in high-boiling hot organic solvents to a deep brown solution, does not even melt at 300° C. and dyes cotton from a clear brown vat greyish-brown tints.

WILHELM ECKERT.